United States Patent [19]

Koneval

[11] 3,903,594

[45] Sept. 9, 1975

[54] METHOD OF MAKING ELECTROGRAPHIC RECORDING HEADS EMPLOYING PRINTED CIRCUIT TECHNIQUES

[75] Inventor: Donald J. Koneval, Arlington Heights, Ill.

[73] Assignee: Gould Inc., Chicago, Ill.

[22] Filed: May 28, 1974

[21] Appl. No.: 473,444

[52] U.S. Cl. .................. 29/603; 29/62 S; 174/68.5; 179/100.41 D; 179/114 R; 346/74 MC

[51] Int. Cl.² .......................................... G11B 5/42

[58] Field of Search ............ 29/624, 62 S, 592, 604, 29/603; 174/68 S; 317/101 B, 101 D, 101 F; 346/139 C, 74 EB, 74 ES, 74 MC; 178/6.6 R, 6.6 A; 156/3, 6, 8, 11; 339/17 F, 17 B; 179/100.41 D, 100.41 B, 100.41 C, 100.41 G, 114 R; 340/174.1 F, 174.1 G

[56] References Cited

UNITED STATES PATENTS

| | | | |
|---|---|---|---|
| 3,578,946 | 5/1971 | Colello | 29/62 S X |
| 3,618,118 | 11/1971 | Lloyd | 317/101 F |
| 3,718,936 | 2/1973 | Rice | 346/74 ES |
| 3,723,635 | 3/1973 | Smith | 29/62 S X |
| 3,805,213 | 4/1974 | Austin | 317/101 F X |
| 3,820,053 | 6/1974 | Champion et al. | 339/17 F |

*Primary Examiner*—Richard J. Herbst
*Assistant Examiner*—Joseph A. Walkowski
*Attorney, Agent, or Firm*—Eber J. Hyde

[57] ABSTRACT

Electrographic recording heads are fabricated using printed circuit techniques. A head with two parallel rows of recording electrode areas is constructed by forming two confronting rows of electrode conductors on one face of a thin substrate. The substrate then is folded and secured together substrate-to-substrate so that there is a row of conductors on each face of the folded structure. The structure then is severed across the conductors adjacent to the fold, exposing a cross sectional area of each conductor thus establishing two rows of recording electrode areas, with the rows separated by the thickness of two layers of substrate material.

A head with a single row of closely spaced electrode areas is constructed in similar fashion except that the substrate is folded conductors-toward-conductors. The conductors of the two rows are dimensioned and located so that the conductors of one row interleave between the conductors of the other row. Thus, when the portion adjacent to the fold is severed, there is exposed a single row of recording electrode areas which may have very close spacing.

Prior to folding the substrate, selected electrode conductors are interconnected by printed circuit techniques.

Front shoe complementary electrodes are formed on separate substrate.

11 Claims, 31 Drawing Figures

METHOD OF MAKING ELECTROGRAPHIC RECORDING HEADS EMPLOYING PRINTED CIRCUIT TECHNIQUES

BACKGROUND OF THE INVENTION

1. Field of the Invention

This invention relates to recording heads for use in electrographic recording systems, and in particular to such heads which are fabricated by the use of printed circuit techniques. 2. Description of the Prior Art In order for an electrographic recorder to print graphic or alphanumeric information with good resolution it is necessary for the recording head to have very small, closely spaced, recording areas. For the recording of graphic information on a full size page, this requires many hundreds of electrode areas. An electrical connection to each electrode area is required.

Individual electrode areas must be spaced from adjacent areas for electrical isolation, and thus a single row of recording electrode areas cannot be expected to print a continuous line parallel to the electrode row. Instead, the printed line is approximated by a row of spaced dots, resulting in poor contrast. This difficulty has been overcome by employing two parallel rows of electrode areas, with the areas of one row offset with respect to the areas of the other row. By suitably timing the recording pulses to the electrodes in the two rows in relation to the spacing of the rows and to the velocity with which the record receiving sheet is transported over the electrode areas, it is possible to print a solid line of contiguous or overlapping dots resulting in improved contrast.

Assembling such recording heads from individual electrode conductors is difficult and expensive. Thus a number of inventors have turned to the use of printed circuit techniques to provide the many electrode areas. Examples are found in U.S. Pat. Nos. 3,267,485 to Howell et al; 3,618,118 to Lloyd; 3,624,661 to Shebanow et al; 3,626,422 to Lloyd; and 3,718,936 to Rice.

Shebanow et al provide two parallel rows of offset recording electrode areas by photo etching conductors on both faces of a printed circuit board. This requires the use of two aligned masks having excellent registration of conductors over the entire length of the circuit board; and subsequent operations such as the interconnecting of electrodes, must be performed on both sides of the board. These factors account for relatively high manufacturing cost.

When a single row of electrode areas is employed, as in U.S. Pat. No. 3,618,118 to Lloyd for example, limitations of etched circuit manufacturing techniques make it relatively expensive to provide the desired close spacing of electrode areas.

In an electrographic recording system having a large number of recording electrodes, the number of electrode drivers, and the number of external connections to the recording head may be reduced by connecting together within the head, spaced electrodes in a matrix arrangement and employing complementary electrodes in what is sometimes called a coincident voltage recording system. Examples are found in U.S. Pat. No. 2,955,894 to Epstein and U.S. Pat. Nos. 3,653,065 and 3,662,396 to Brown, and U.S. Pat. No. 3,718,936 to Rice. The Rice Patent describes a matrix type printed circuit head intended for character printing in which the electrode interconnections are made by forming interconnecting bus bars on the "back sides" of the printed circuit boards, making connections to appropriate electrode conductors by means of "plated through" holes.

SUMMARY OF THE INVENTION

An object of the present invention is to provide an improved method for the manufacture of double electrode-row electrographic recording heads.

Another object of this invention is to provide an improved method of fabricating single electrode-row electrographic recording heads.

A further object is to provide an improved method of making bridging connections between printed circuit conductors which is particularly useful for interconnecting electrode conductors in a matrix type printed circuit head.

This invention provides a method of fabricating an electrographic recording head having at least one row of recording electrode areas. An elongated rectangular expendable portion is defined by two parallel severance lines on a sheet of flexible circuit board, with first and second electrode supporting portions flanking the expendable portion. A first row of electrode conductors is formed on the first electrode supporting portion, and a second row of electrode conductors is formed on the second electrode supporting portion. All conductors are formed on the same face of the sheet and each conductor extends across the adjacent one of the severance lines and at least partially over the expendable portion.

The sheet is folded with the bend of the fold located along the center of the expendable portion, bringing into close proximity to each other areas of the first and second electrode supporting portions which are adjacent to the expendable portions, and also bringing into close proximity to each other areas of the expendable portion which are adjacent to the conductor supporting portions. The areas which are in close proximity to each other are secured together. The expendable portion then is severed from the secured together first and second electrode supporting portions thereby exposing a cross sectional area of each of the conductors to establish the recording electrode areas.

In one embodiment of the invention the sheet is folded substrate-to-substrate so that the conductors are exposed and separated by at least twice the thickness of the substrate material. When the expendable portion is severed there are exposed two parallel rows of recording electrode areas.

In another embodiment the spaces between conductors are wider than the conductors, and the conductors of one row are in alignment with spaces between conductors of the other row. The sheet is folded conductors-toward-conductors so that the conductors on one supporting portion of the substrate interleave between the conductors on the other supporting portion. When the expendable portion is severed there is exposed a single row of closely spaced electrode areas.

In another embodiment adjacent conductors are closely spaced, and the conductors of one row are in alignment with the conductors of the other row. The sheet is folded conductors-to-conductors. When the expendable portion is severed there is exposed a single row of electrode areas, each area composed of the cross sectional areas of two contiguous conductors, one from each row of conductors.

DESCRIPTION OF THE PREFERRED EMBODIMENTS

In the following description reference is made to U.S. Pat. No. 3,611,419 to Blumenthal, and to U.S. Pat. Nos. 3,653,065 and 3,662,396 to Brown, all assigned to the same assignee as the present invention. The invention, however, is not limited to recording heads and systems described in those patents.

Figure 1A:
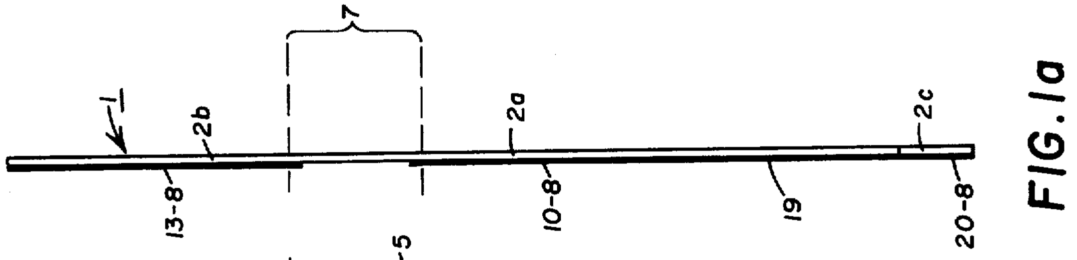
FIGS. 1 and 1*a* show a circuit board prepared for use in constructing an electrographic recording head according to this invention, having two rows of recording electrodes.
Figure 1:
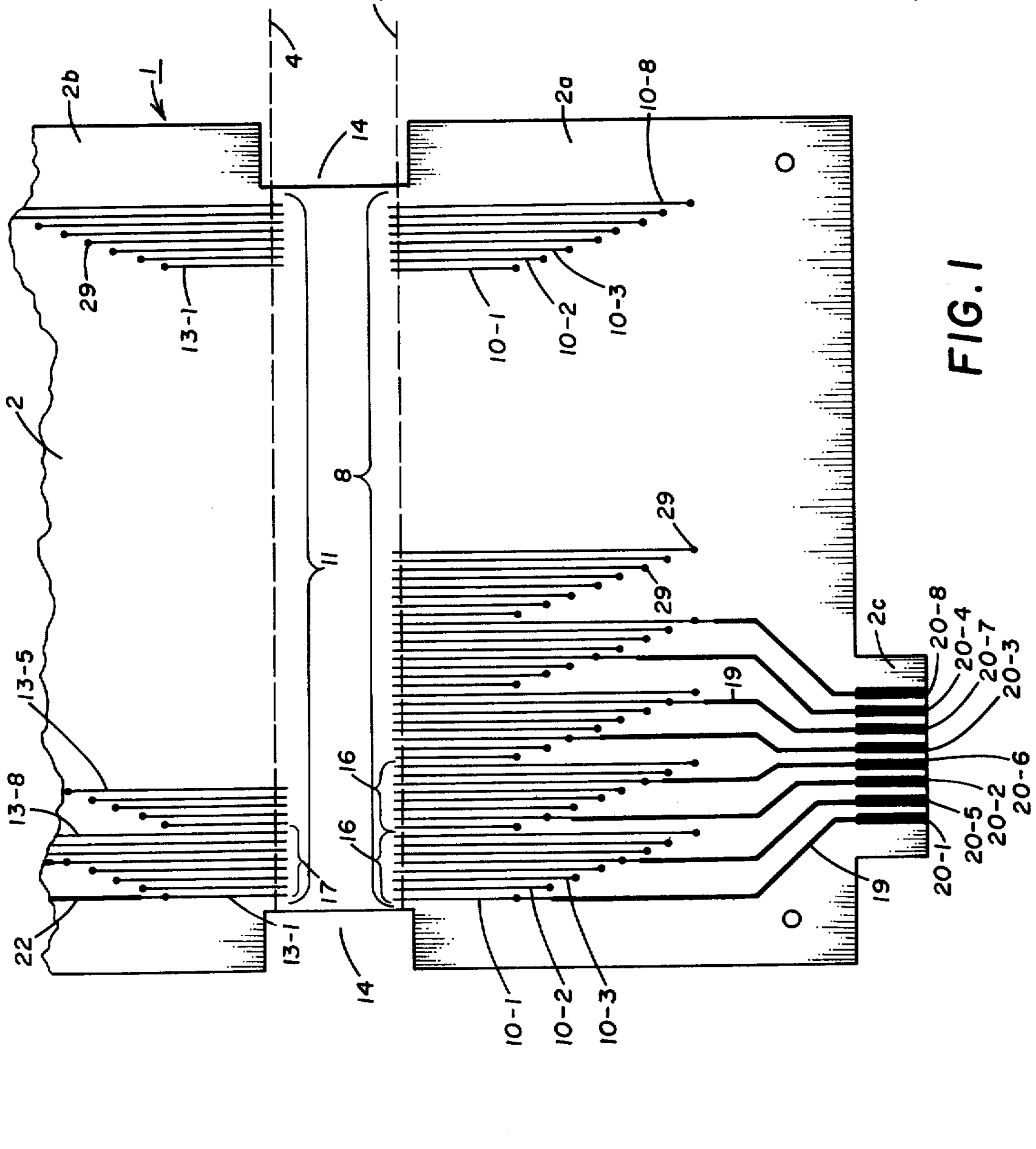

FIGS. 1 and 1*a* show how a flexible circuit board 1 may be prepared, according to the present invention, for construction of an electrographic recording head having two parallel rows of recording electrode areas. Substrate 2 may be a thin sheet of flexible insulative material common to the printed circuit art such as "MYLAR", "KAPTON", or epoxy bonded glass fibers. The thickness of substrate 2 may be in the range of one to ten mils and is determined by the desired separation between electrode rows as will become apparent later in this specification.

In FIG. 1*a*, and in other figures showing an edge view of a substrate or other thin insulative member, the thickness of the member has, of necessity, been greatly exaggerated. In the case of conductors on a face of a substrate the thickness also has been exaggerated but, to help distinguish from insulative materials, edge views of conductors are shown as heavy solid lines.

Dashed lines 4 and 5 define an elongated rectangular portion 7 of circuit board 1 which later will be severed along lines 4 and 5 and discarded. Thus, portion 7 is identified as an expendable portion, and lines 4 and 5 may be referred to as severance lines.

Expendable portion 7 is flanked by a first electrode conductor supporting portion 2*a* of substrate 2, and a second electrode conductor supporting portion 2*b*.

A first row 8 of conductors 10 is formed on substrate portion 2*a* by known printed circuit techniques, and a second row 11 of conductors 13 is similarly formed on substrate portion 2*b*. The portions of conductors 10 and 13 which are adjacent to expendable portion 7 preferably are straight, parallel, equally spaced, and perpendicular to the length of expendable portion 7. Further, every conductor extends across line 4 or 5 and at least partially over expendable portion 7. (Conductors 10 may join conductors 13 on expendable portion 7 as will be described later in the specification.)

It should be understood that dashed lines 4 and 5 are convenient for purposes of illustration and description, but they need not be actually marked on the circuit board material. The delineation of expendable portion 7 and flanking contact support portions 2*a* and 2*b* may in fact be incorporated only in the design of the tools and masks used in manufacturing the recording heads and this should be regarded as satisfying the language of the claims regarding definition of the various portions of circuit board 1 or substrate 2.

In the interest of clarity of the drawing, the width and thickness of the conductors and the spacing between adjacent conductors is shown greatly exaggerated, and therefore the number of conductors shown is smaller than would be employed in an actual head. By way of example, actual electrode conductors may be ten mils wide or less and the spacing between adjacent conductors may be about equal to the conductor width or a little narrower. The conductor thickness may be on the order of 1.4 – 7.0 mils.

Electrode conductors 13 of row 11 are aligned with the spaces between conductors 10 of row 8. The offset relationship of conductors 10 with respect to conductors 13 is insured by forming both rows of conductors simultaneously using a single accurately dimensioned mask in the photo etching process.

Areas 14 of substrate 2, at the ends of expendable portion 7, are cut out, preferably after formation of conductors 10 and 13.

Means must be provided for connecting every electrode conductor to an external circuit. If the electrodes are few in number as might be the case for example in a head designed for printing a line of characters while being mechanically transported across the record medium, the electrode conductors 10 and 13 may be "fanned out" in areas remote from expendable portion 7 and terminated in contact areas arranged to mate with a detachable connector to which the external circuits are connected. Alternatively, wires from the external circuits may be soldered to the contact areas.

When a large number of electrodes is used, as in a head designed for graphic recording for example, some form of matrixing generally is employed in order to reduce the number of electrode drivers required as well as to reduce the number of external connections to the head. A preferred arrangement suitable for graphic recording is described in U.S. Pat. No. 3,653,065 to Brown. The lengths of electrode conductors 10 and 13 in FIG. 1 are proportioned to facilitate interconnection of conductors for use in such a matrixing arrangement.

Conductors 10 are arranged in identical clusters 16 of eight conductors per cluster, the electrodes in each cluster being identified as 10-1 through 10-8. Progressing from left to right, each successive conductor in a cluster is longer than the preceding conductor. The purpose of this arrangement is to facilitate interconnection of like numbered conductors.

Certain conductors of the four clusters on the left are connected by continuing conductors 19 to contact areas 20 which are formed on projection 2c of substrate 2. Contact area 20-1 connects to a conductor 10-1, contact area 20-2 connects to a conductor 10-2, etc. After the interconnections, presently to be described, are completed, area 20-1 will connect to every conductor 10-1, area 20-2 will connect to every conductor 10-2, etc. Contact areas 20 of the completed head assembly, may be engaged by a mating connector having wires extending to external circuits.

Conductors 13 are similarly arranged in cluster 17 and connected by continuing conductors 22 to contact areas 23 on substrate projection 2d not shown in FIG. 1.

The first step in the preferred method of interconnecting electrode conductors is to fill the spaces between electrode conductors, and adjacent to the end conductors with an insulative material to provide a level surface across each row of conductors. For this purpose an epoxy type paint may be used and applied by means of a stiff squeegee. A suitable paint is supplied by Wornow Process Paint Co., 1218 Long Beach Avenue, Los Angeles, California 90021, under the trade name: CAT-L-INK and identified as 50-000 series.

Figure 2:
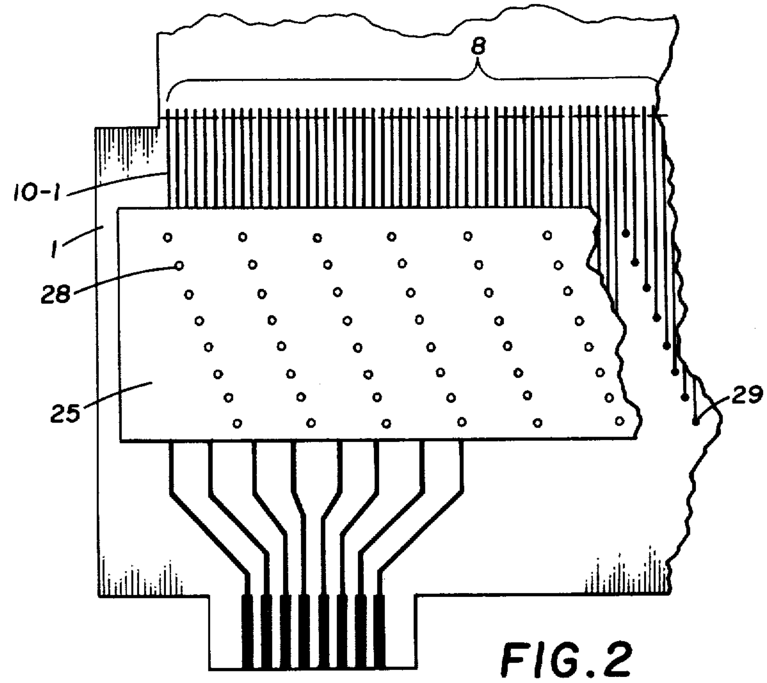
FIGS. 2, 2*a*, 3, 3*a* and 3*b* illustrate steps in providing interconnections between selected electrode conductors and terminal areas.
Figure 2A:
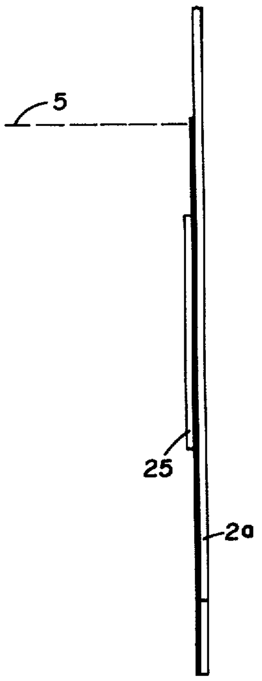

Referring to FIGS. 2 and 2a, after the filler material has cured, a sheet of photo resist film such as the material sold by Dupont under the trade name RISTON, is secured to the face of board 1, covering the conductors thereon. The film is used as an insulating layer to separate the interconnecting bus bars, next to be described, from electrode conductors to which the bars are not connected. If greater insulation thickness is desired, two or more layers of photo resist may be applied. The film then is photo-etched by known techniques to leave strip 25, and similar strip 26, not shown in FIG. 2. Small through openings 28 are etched in each strip in register with the enlarged ends 29 of the conductors to which connections are to be made, as shown in FIG. 2. Each opening in the top row in strip 25 is in register with an end of a conductor 10-1. The openings in the second row are in register with conductors 10-2 etc. The openings of one row in strip 26 are in register with the ends of conductors 13-1; the openings in the next row are in register with the ends of conductors 13-2 etc. Thus, in each strip 25 and 26 there are eight rows of openings corresponding to eight conductors in a cluster.

Figure 3B:
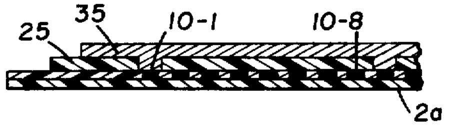
Figure 3:
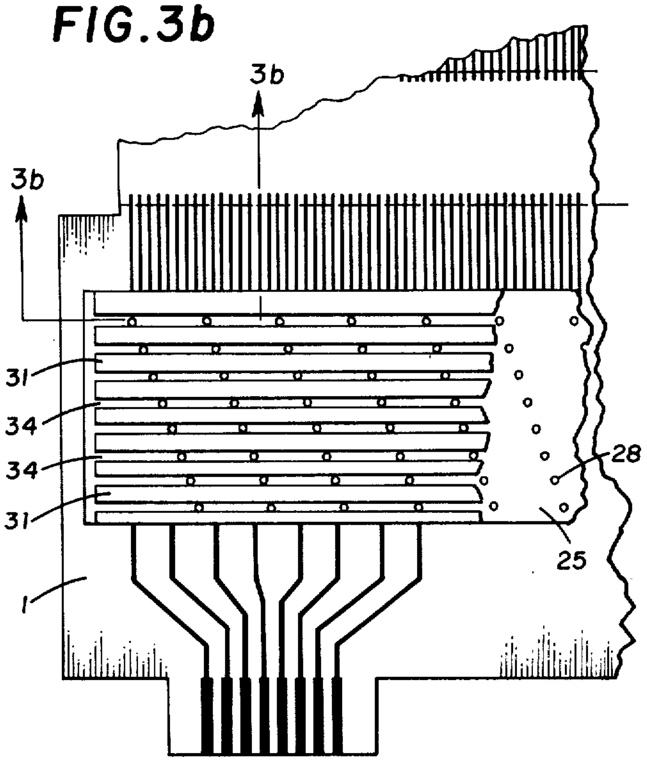
Figures 3A, 4:
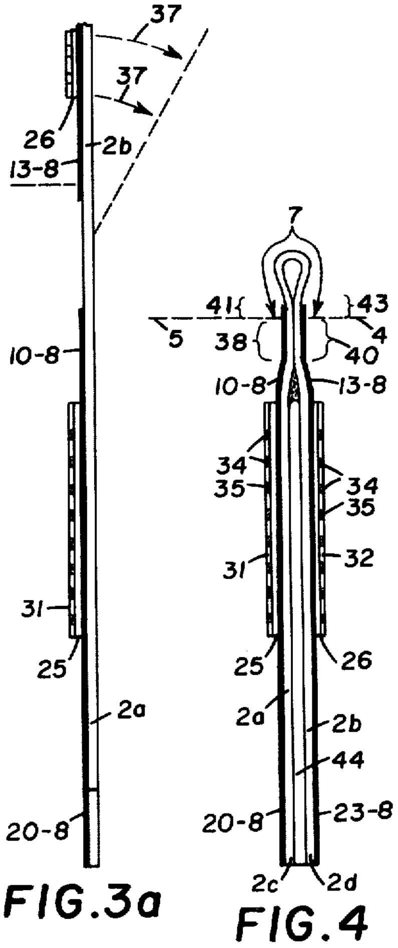
FIG. 4 shows a further step in fabricating the head.

An additional film or layers of film are next secured to the face of board 1 covering strips 25 and 26. The film then is photo etched to remove all except narrow strips 31 on top of strip 25 and narrow strips 32 on top of strip 26 as shown in FIGS. 3 and 3a. Strips 31 are separated by channels or slots 34. The number of slots 34 between strips 31 equals the number of rows of openings 28 in strip 31. The slots are positioned to pass directly over openings 28 are shown in FIG. 3.

Slots 34 between strips 32 are positioned over openings 28 in strip 26.

The final step in making the interconnections is to fill the slots 34 and openings 28 communicating therewith with conductive epoxy 35. This is shown in FIG. 3b which is a section (enlarged) along lines 3b-3b of FIG. 3 after adding the epoxy. After the conductive epoxy has cured, all conductors 10-1 and contact area 20-1 are connected together, as are all conductors 10-2 and contact area 20-2, conductors 13-1 and contact areas 23-1, etc.

The next step in forming a double electrode-row head is to fold circuit board 1 substrate-to-substrate with the bend at the expendable portion 7 as indicated by arrows 37 in FIG. 3a so that the conductors 10 and 13 are on the outside as shown in FIG. 4. Then areas 38 and 40 of substrate portions 2a and 2b, which are adjacent to severance lines 5 and 4 are secured together, and so also are areas 41 and 43 of expendable portion 7 which are adjacent to substrate portions 2a and 2b. The securing means may be a thin layer of epoxy adhesive applied to the confronting surfaces prior to folding the circuit board. The folded board may be clamped together to overcome the tendency of bent expendable portions 7 to open up while the epoxy is curing.

The remaining areas of substrate portions 2a and 2b may also be secured together directly by epoxy adhesive, or preferably, as shown in FIG. 4, they may be secured together by securing them to opposite faces of a spacer 44 to add thickness and stiffness to the structure.

Figure 5B:
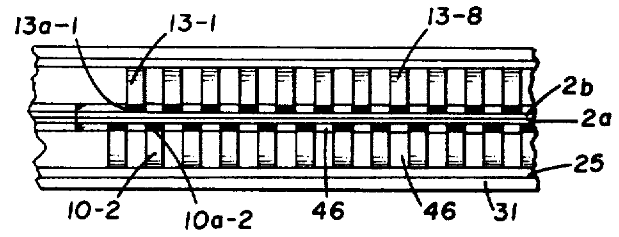
FIGS. 5, 5*a*, and 5*b* are views of the completed head assembly.
Figure 5:
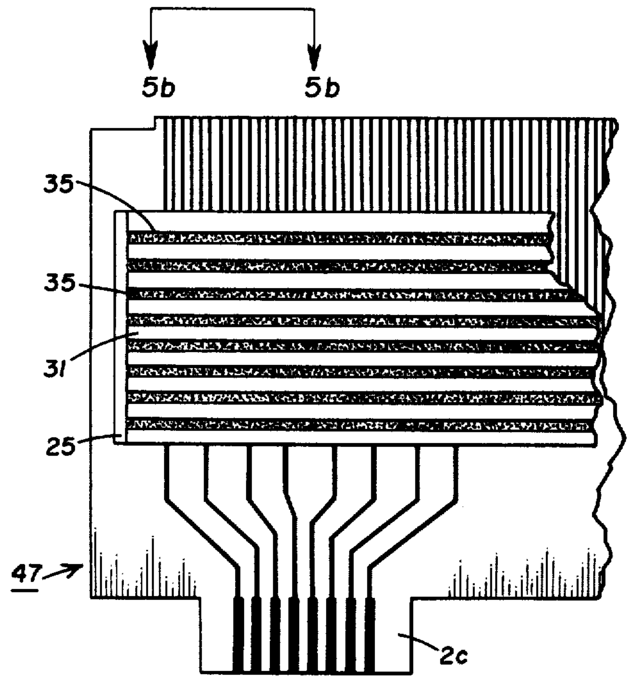

The remaining step in providing a double row of recording electrode areas, is to sever expendable portion 7, including the portions of conductors 10 and 13, extending thereover, from secured together substrate portions 2a and 2b along lines 4 and 5. This leaves the finished head assembly 47 shown in FIGS. 5, 5a, 5b. FIG. 5b is an enlarged top edge view of FIG. 5 showing the exposed cross sectional area 10a of each conductor 10 and the exposed cross sectional area 13a of each conductor 13. The epoxy paint used to fill in spaces between conductors is shown at 46 in FIG. 5b.

Figure 5A:
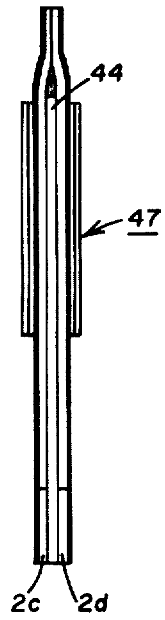

Referring to FIG. 5b, it can be seen that the two rows of electrode areas 10a and 13a are spaced apart a distance equal to twice the thickness of the substrate material (plus a slight thickness of adhesive which is not shown). Thus the thickness of the substrate material selected for use in fabricating the head is dictated primarily by the desired spacing between electrode rows. However, if a large spacing is desired, it may be obtained by using a thin substrate plus a spacer; for example by extending spacer 44 into folded expendable portion 7. (FIGS. 4 and 5a). In this case area 38 is secured to area 40 and area 41 is secured to area 43 by spacer 44 and two layers of adhesive, and the severing step includes severing the portions of spacer 44 which extends beyond lines 4 and 5 into bent portion 7.

A major advantage of this method of fabricating a double electrode-row electrostatic recording head is that the accuracy of alignment of the electrode areas in the two rows depends almost exclusively on the accuracy of the single mask employed in photo-etching the electrode conductors on a single sheet of substrate material.

Figure 6:
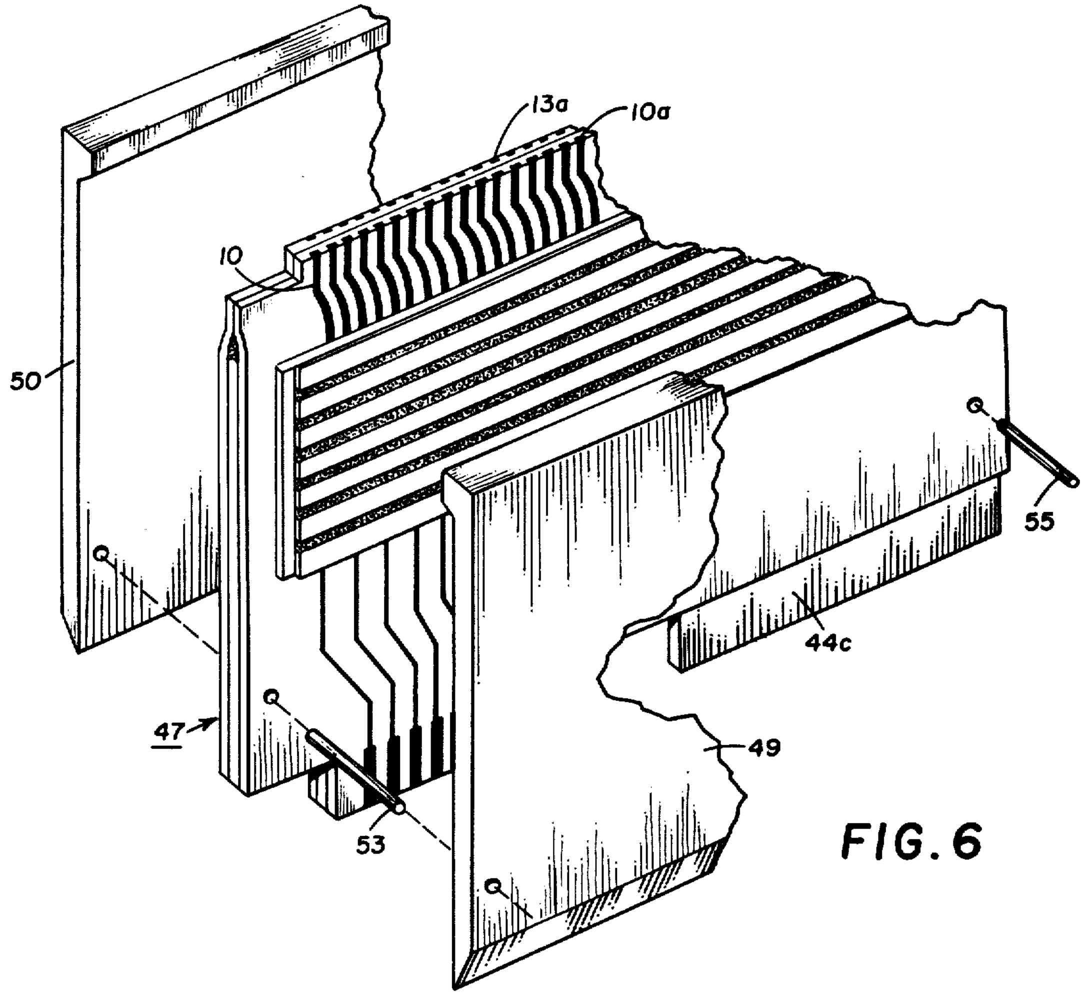
FIGS. 6 and 6*a* show how the head assembly of FIG. 5 may be enclosed in a protective and supportive structure.

FIG. 6 is an exploded view showing how head assembly 47 of FIG. 5 may be enclosed in a housing comprising cover plates 49 and 50 of insulative material such as linen filled phenolic. The parts may be held together by an epoxy adhesive 52 as shown in end view FIG. 6*a*. Dowel pins 53 and 55 may be employed to hold the parts in alignment during the curing of the epoxy. For a purpose which will be explained later, portion 47*a*, of head assembly 47, containing the electrode areas 10*a* and 13*a* projects slightly above curved surfaces 56 and 58 of cover plates 49 and 50.

Figure 8:
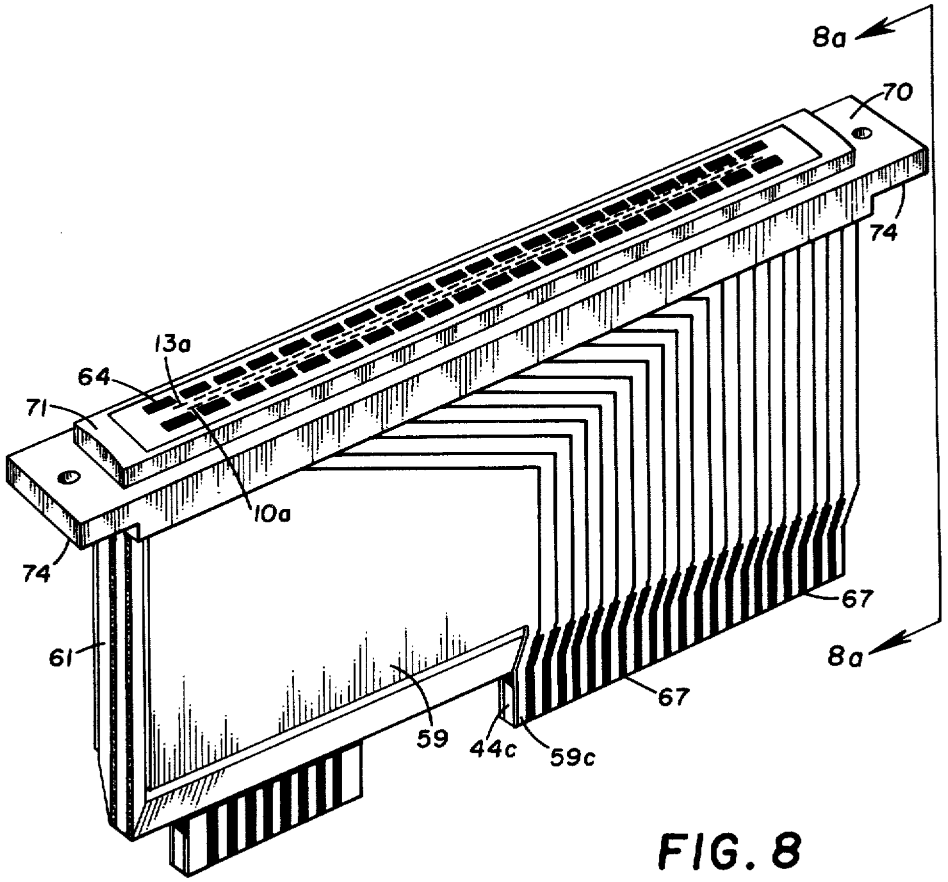
FIGS. 8 and 8*a* show the assembly of FIG. 6 with the shoe circuit board of FIG. 7 attached and with the addition of a mounting bracket.

In the interest of clarity, conductors 10, and electrode areas 10*a* and 13*a* in FIGS. 6 and 8 are shown larger, and fewer in number than in FIGS. 1 through 5*b*.

In FIG. 6 a portion 44*c* of spacer 44 may be seen projecting from the lower edge of head assembly 47. This will form a support for contact areas of a second circuit board next to be described.

Figure 6A:
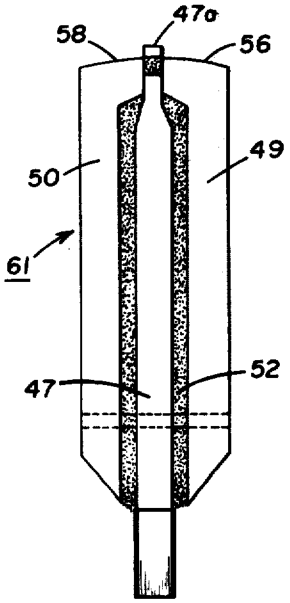
Figure 7A:
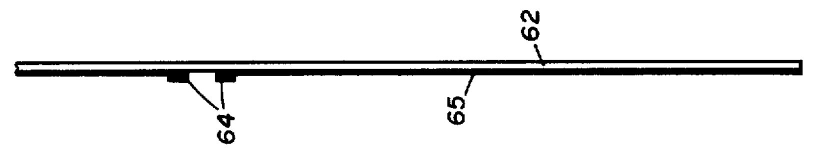
FIGS. 7 and 7*a* show a circuit board prepared for attachment to the assembly of FIG. 6 to provide complementary or shoe electrodes.
Figures 7, 7B:
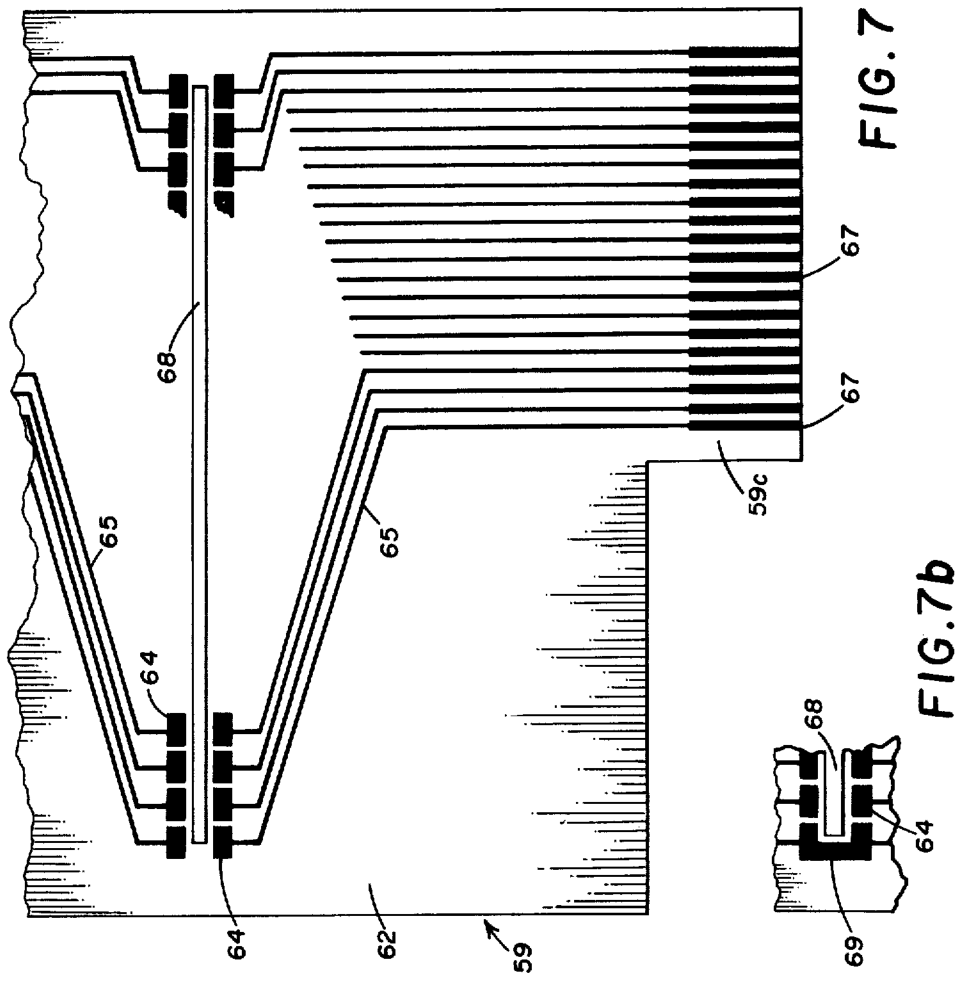
FIG. 7*b* shows a modification of the end electrodes of FIG. 7.

FIG. 7 shows a plan view and FIG. 7*a* shows an edge view of a circuit board 59 which may be prepared for the purpose of providing front shoe or complementary electrodes for the housed head assembly 61 of FIGS. 6 and 6*a*. Front shoe electrodes are described and their mode of operation is explained in U.S. Pat. No. 3,611,419 to Blumenthal.

Substrate 62 may be on the order of one to ten mils thick. Front shoe electrodes 64 are formed in two parallel rows. Following the teachings of U.S. Pat. Nos. 3,653,065 and 3,662,396 to Brown the number of shoe electrodes in each row is twice the number of clusters 16 or 17 of electrode conductors in FIG. 1 plus one shoe. The shoes are so dimensioned that a row of shoes is one shoe longer than a row 8 or 11 of electrode conductors of FIG. 1. Since opposite shoes usually are electrically connected together, the end shoes may be joined at 69 as shown in FIG. 7*b*.

Each shoe electrode is connected by a conductor 65 to a contact area 67 on one of the projections 59*c* which are dimensioned to match portion 44*c* of spacer 44 (FIG. 6).

The conductors may conveniently be about 2.8 mils thick, but the thickness of each shoe electrode 64 preferably is built up to the order of 8 to 10 mils by electroplating with nickel or chromium.

Next an elongated rectangular slot 68 is cut in circuit board 59 between the rows of shoe electrodes 64. The dimensions of the slot are just large enough to clear the projecting portion 47*a* of head assembly 47 of FIG. 6*a*.

Figure 8A:
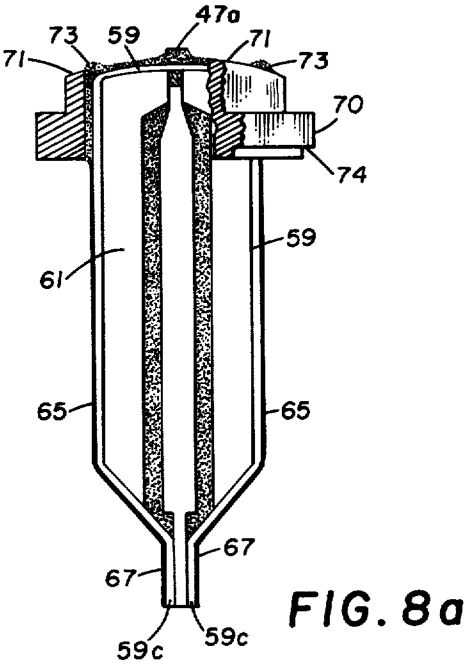

FIGS. 8 and 8*a* show the shoe electrode circuit board 59 of FIG. 7 wrapped around and secured to the housed head assembly 61 of FIGS. 6 and 6*a*. The securing means may be an epoxy adhesive. Projection 47*a* of head assembly 47 fits into slot 68 in circuit board 59 and, as shown in FIG. 8*a*, it initially extends through and outwardly from board 59. Projections 59*c* of circuit board 59 are secured to opposite faces of portion 44*c* of spacer 44 where contact areas 67 may be engaged by a mating connector having leads to external circuits. Bending of the circuit board to fit the contour of assembly 61 may be facilitated by first removing substrate material along each bend line. Substrate material such as MYLAR may be removed by use of a heated tool.

Support bracket 70 is secured to the assembly by adhesive after attachment of circuit board 59. The upper surface 71 of bracket 70 is curved to match approximately the curvature assumed by circuit board 59 when it is secured to curved surfaces 56 and 58 of cover plates 49 and 50 (FIG. 6*a*). All depressions in the generally curved surface of the composite assembly, such as the spaces between shoe electrodes 64, the joints between walls of slot 68 and projection 47*a*, and the joints between bracket 70 and circuit board 59 are filled with epoxy 73 as shown in FIG. 8*a*. The surface then is machined and lapped to the desired final curvature, suitably referenced to mounting surfaces 74 of bracket 70. The machining removes some of the thickness previously added to shoe electrodes 64 by electroplating, and trims back projection 47*a*, exposing new but identical electrode areas 10*a* and 13*a*. This forms a smooth track over which the record medium may travel with the record retentive surface of the medium in contact with all recording electrode areas 10*a* and 13*a* and shoe electrode areas 64. FIG. 8 shows the final assembly after the track surface has been ground.

A variation of the method just described for making recording head assembly 47 (FIG. 5) is illustrated in FIGS. 9, 9*a*, 9*b* and 10. This variation involves an additional step, but the folding of the circuit board and the securing together of areas of the folded board are more easily accomplished.

Figures 9, 9A, 9B, 10, 11, 11A, 11B, 12:
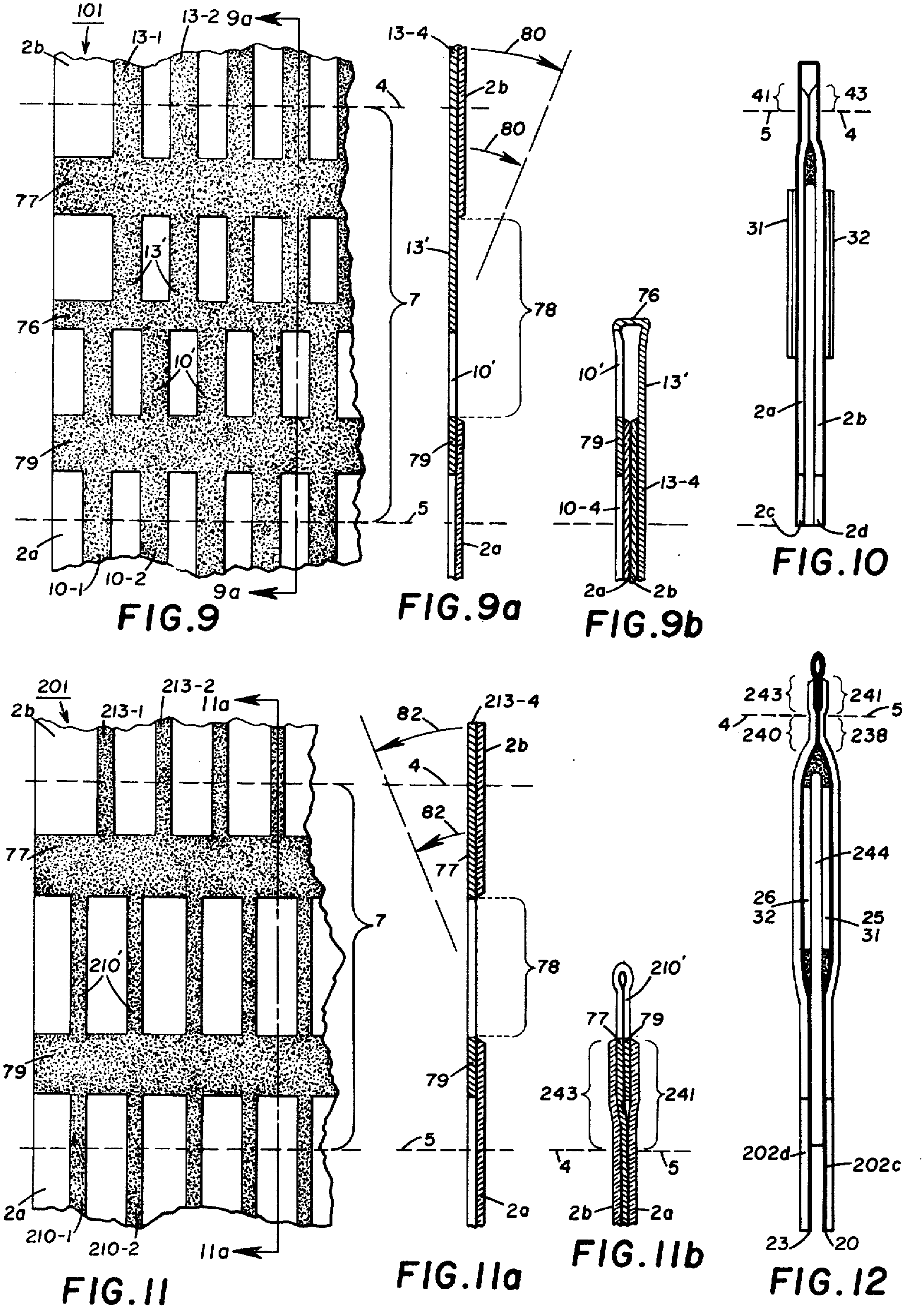
FIGS. 9 and 9*a* show a small portion of a circuit board similar to the board of FIG. 1 but incorporating modifications of the conductor pattern.
FIGS. 9*b* and 10 illustrate a step in fabricating a head employing the board of FIGS. 9 and 9*a;*
FIGS. 11 and 11*a* show a small portion of a circuit board similar to the board of FIG. 1 but with conductors modified for construction of a head having a single row of electrodes.
FIGS. 11*b* and 12 show a step in fabricating a head from the circuit board of FIGS. 11 and 11*a;*

FIG. 9 is a much enlarged plan view of a small area of a circuit board 101 which may be the same as board 1 of FIG. 1 except for the conductor pattern on expendable portion 7. Extensions 10' of conductors 10 join extensions 13' of conductors 13 at transverse conductor 76 which is on expendable portion 7 and extends the full length thereof. Preferably, additional transverse conductors 77 and 79 are provided, adjacent to severance lines 4 and 5, respectively.

Conductors 10 are interconnected as are conductors 13, as described in reference to FIGS. 2, 2*a*, 3 and 3*a*.

The additional step in this variation of the method is performed prior to folding board 101. A strip of substrate material 78 is removed from expendable portion 7 as shown in FIG. 9*a*. This strip is removed over the full length of expendable portion 7. When the substrate 2 is made of material such as MYLAR, the strip may readily be removed by melting, using a heated tool.

After removal of the strip of substrate material, portions 2*a* and 2*b* are maintained in lateral alignment by joined conductor extensions 10' and 13'. Transverse conductors 77 and 79 help prevent damage to conductors 10 and 13 during further processing.

Next, board 101 is folded, substrate-to-substrate as indicated by arrows 80 in FIG. 9*a*. Since substrate material has been removed from expendable portion 7, the folding step involves bending only conductor extensions 10' and 13' which are relatively soft and therefore provide only small resistance to bending. The bent form of expendable portion 7 is shown in FIG. 9*b*.

The arrangement of joining conductor extensions 10' and 13' on expendable portion 7 may be varied, but it has been found desirable to avoid widening transverse conductors 77 and 79 to completely fill the space between them as this unduly increases the resistance to bending. One possible variation is to omit transverse conductor 76, and to angle conductor extensions 10' and 13' slightly so that they join end-to-end. Preferably, transverse conductors 77 and 79 should be retained.

After folding board 101, substrate portions 2*a* and 2*b* may be secured together and areas 41 and 43 of bent expendable portion 7 may be secured together as previously described. FIG. 10 is an edge view of the secured together structure.

The final step is to sever bent expendable portion 7 along lines 4, 5. The resulting head assembly is identical with assembly 47 of FIG. 5.

If it is desired to produce a recording head with two spaced rows of aligned rather than offset electrode areas, it is necessary only to modify the circuit board 1 of FIG. 1 by arranging for electrode conductors 13 to be in alignment with conductors 10. In the modification of the method described in connection with FIGS. 9 and 10, conductors 10 may continue directly across expendable portion 7 to aligned conductors 13, and transverse conductor 76 may be omitted. It is desirable to retain transverse conductors 77 and 79. Depending on the application it may be desirable to reduce the spacing between conductors.

The preceding paragraphs have described methods of making an electrographic recording head having two rows of recording electrode areas. Similar methods may be employed to produce a head having a single row of electrode areas, as described in the following paragraphs.

FIG. 11 is an enlarged plan view of a small portion of a circuit board 201 which may be used to construct a single electrode-row head. Board 201 is similar to board 101 of FIG. 9, and board 1 of FIG. 1, differing primarily in the relative dimensions of electrode conductors and spaces between conductors. In FIG. 11 conductors 210 and 213 are slightly narrower than the spaces between adjacent conductors. The conductors may for example be seven mils wide and the spaces between conductors may be nine mils.

Conductors 210 are arranged in a row in clusters just as are conductors 10 in FIG. 1. Similarly conductors 213 are arranged just as are conductors 13 in FIG. 1. The conductors are interconnected, and connected to terminal areas 20 and 23 in the manner described in reference to FIGS. 1, 2, *2a*, 3, and *3a*.

An expendable portion 7 of board 201 is defined by severance lines 4 and 5. Conductors 210 are joined with conductors 213 on expendable portion 7 by means of conductor extensions 210' and transverse conductors 77 and 79.

After formation of the electrode conductors, a narrow strip of substrate material 78 is removed from expendable portion 7, as shown in FIG. 11*a*, extending the full length of portion 7.

Next, circuit board 201 is folded, conductors-toward-conductors as indicated by arrows 82 in FIG. 11*a*. Since a strip of substrate material was removed from expendable portion 7, the folding step involves bending only conductor extensions 210' as shown in FIG. 11*b*.

Due to the relative dimensions and placement of conductors, conductors 213 interleave between conductors 210 so that substrate portion 2*a* is spaced from substrate portion 2*b* by the thickness of only one conductor as shown in FIG. 11*b*. In bent expendable portion 7, the spacing increases to the thickness of two conductors where transverse conductor 77 is juxtaposed over conductor 79, and conductor extensions 210' are doubled over.

Areas 241 and 243 of bent expendable portion 7 are cemented together as are areas 238 of portion 2*a* and 240 of portion 2*b*.

FIG. 12 is a full end view of the folded and secured together board 201. Immediately beyond cemented areas 238 and 240, the extending portions of folded board 201 are separated by and cemented to insulating spacer 244. Portions 202*c* and 202*d* bearing contact areas 20 and 23 extend beyond spacer 244 and are not supported.

Figure 13A:
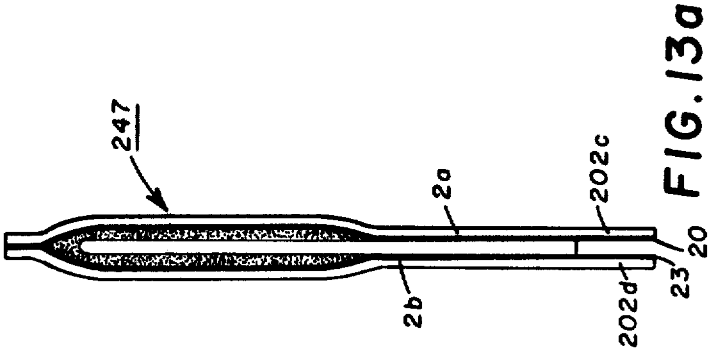
FIGS. 13, 13*a* and 13*b* show the completed single electrode-row head assembly.
Figure 13B:
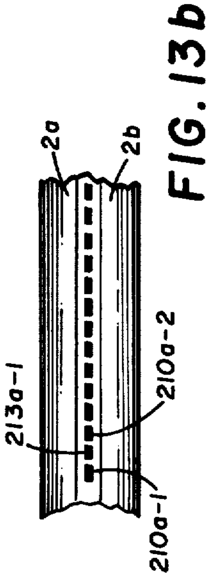
Figure 13:
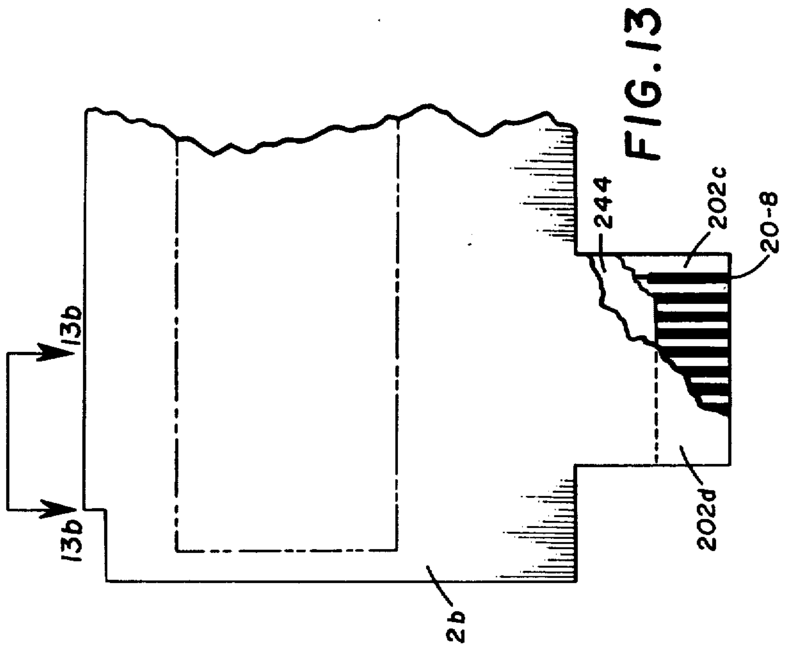

The bent expendable portion 7 next is severed along lines 4, 5. The resulting recording head assembly 247 is shown in FIGS. 13, 13*a* and 13*b*. FIG. 13*b* is an enlarged partial top edge view showing the single row of recording electrode areas 210*a* and 213*a* exposed by severing interleaved conductors 210 and 213.

A major advantage of this method of fabricating a single electrode row recording head is that relatively thick electrode conductors can be located very close together, closer than can really be done by conventional etching of side-by-side conductors.

Another way to achieve relatively thick electrode conductors with close spacing is to modify the electrode pattern of circuit board 201 so that conductors 210 and 213 are in alignment, and to decrease the spacing between conductors to the minimum practical spacing for the selected conductor thickness. When the circuit board is folded, conductors-toward-conductors each conductor 210 lies against a conductor 213. The substrate portions 2*a* and 2*b* in the vicinity of severance lines 4 and 5 then are spaced apart by the thickness of two conductors. When the folded and secured together board is severed along lines 4 and 5 there will be exposed a single row of electrode areas, each consisting of a cross section of a conductor 210 contiguous with a cross section of a conductor 213.

Figure 14A:
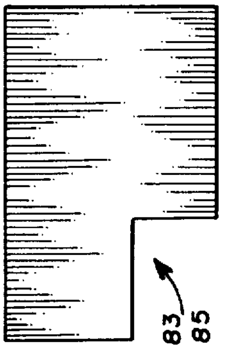
FIG. 14*a* shows an insulative spacer used in the assembly of FIG. 14.
Figure 14:
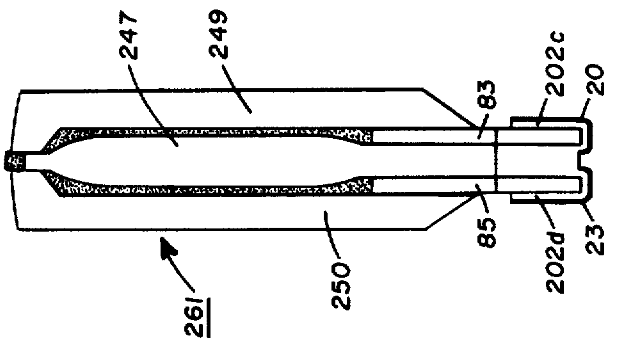
FIG. 14 shows how the head assembly of FIGS. 13 may be enclosed in a protective and supportive structure.

FIG. 14 is an end view, similar to FIG. 6*a*, of head assembly 247 enclosed by cover plates 249 and 250. Spacer 82 (FIG. 14*a*) is secured to cover 249 in alignment with contact supporting extension 202*c* (FIG. 13). Similarly, spacer 85 (FIG. 14*a*) is secured to cover 250 in alignment with contact supporting extension 202*d*. Extension 202*c* is folded around and cemented to spacer 83 as shown in FIG. 14, thus exposing contact areas 20 which, in FIG. 13*a* are facing inwardly. Similarly extension 202*d* is folded around and cemented to spacer 85, exposing contact areas 23. The folding or contact extensions 202*c* and 202*d* may be facilitated by first removing substrate material in the areas to be bent. Contacts 20, 23 may be engaged by a mating connector having wires extending to external circuits.

The assembly 261 of FIG. 14 may be provided with front shoe electrodes by attaching a shoe circuit board (FIG. 7), and may be provided with a mounting bracket 70, both as shown in FIGS. 8 and 8*a* and described in reference thereto.

Head assembly 47 of FIGS. 5*a*, 6 and 6*a*, and head assembly 247 of FIGS. 13*a* and 14, and variations of such assemblies may be employed in recording systems which do not involve front shoe complementary electrodes. For such use, shoe circuit board 59 of FIG. 7 may be omitted from the assembly of FIGS. 8 and 8*a*; or any other suitable means may be employed for supporting assembly 47 or 247 in the recording apparatus.

While there have been described what are at present considered to be the preferred embodiments of this invention, it will be obvious to those skilled in the art that various changes and modifications may be made therein without departing from the invention, and it is aimed therefore, in the appended claims to cover all such changes and modifications as fall within the true spirit and scope of the invention.

What is claimed is:

1. The method of fabricating an electrographic recording head having at least one row of recording electrode areas which comprises:

on a sheet of flexible circuit board material comprising a substrate of insulative material, defining by means of parallel severance lines and elongated rectangular expendable portion, and first and second electrode conductor supporting portions flanking said expendable portion;

forming on said first conductor supporting portion a first row of electrode conductors; and forming on said second conductor supporting portion a second row of electrode conductors; each of said conductors of said first and second rows being formed on the same face of said sheet of material, and extending across the adjacent one of said severance lines and at least partially over said expendable portion;

folding said sheet with the bend of said fold located along the center of said expendable portion thereby bringing into close proximity to each other areas of said first and second electrode supporting portions which are adjacent to said expendable portion, and also bringing into close proximity to each other areas of said expendable portion which are adjacent to said conductor supporting portions;

securing together said areas which are in close proximity to each other; and severing said expendable portion, including the extensions thereover of said electrode conductors, from said secured together areas of said first and second conductor supporting portions, thereby exposing a cross sectional area of each of said conductors to establish said recording electrode areas.

2. The method described in claim 1 in which all of said conductors of said first row and of said second row have equal widths and are equally spaced.

3. The method described in claim 2 in which said sheet is folded substrate-toward-substrate so that said electrode conductors are exposed, and separated by at least twice the thickness of said substrate material, whereby there are formed, by severing of said expendable portion, two parallel rows of recording electrode areas.

4. The method described in claim 2 in which the spaces between adjacent conductors are wider than said conductors, and in which said sheet is folded conductors-toward-conductors, said conductors being so located that the conductors of said first row interleave between the conductors of said second row in an area adjacent to said expendable portion whereby there is formed, by severing said expendable portion, a single row of closely spaced electrode areas.

5. The method described in claim 1 in which conductors of said first row are joined on said expendable portion to conductors of said second row, and including the step of removing a strip of substrate material from the center of said expendable portion along the full length thereof prior to folding said sheet.

6. The method described in claim 5 in which all of said conductors of said first row and of said second row have equal widths and are equally spaced.

7. The method described in claim 6 in which said sheet is folded substrate-toward-substrate so that said electrode conductors are exposed and separated by at least twice the thickness of said substrate material, whereby there are formed, by severing said expendable portion, two parallel rows of recording electrodes.

8. The method described in claim 6 in which the spaces between adjacent conductors are wider than said conductors, and in which said sheet is folded conductors-toward-conductors, said conductors being so located that the conductors of said first row interleave between the conductors of said second row in an area adjacent to said expendable portion whereby there is formed, by severing said expendable portion, a single row of closely spaced electrode areas.

9. The method described in claim 6 in which said sheet is folded conductors-toward-conductors, said conductors being so located that each conductor in said first row lies in face to face contact with a conductor in said second row in an area adjacent to said expendable portion whereby there is formed, by severing said expendable portion, a single row of electrode areas, each area comprising a cross sectional area of a conductor of said first row contiguous to a cross sectional area of a conductor of said second row.

10. The method described in claim 1 which includes, prior to folding said sheet, the further steps of:

applying a photo-resist film to the face of said sheet over said electrode conductors;

photo-etching openings through said film in a plurality of rows parallel to the length of said elongated expendable portion, with each opening in register with a different one of said electrode conductors;

forming over said photo-resist film a plurality of conductors, each conductor lying directly over a different one of said rows of openings and extending through each of said openings in said row and making electrical contact with the electrode conductor which is in register with each of said openings.

11. The method described in claim 1 which includes, prior to folding said sheet, the further steps of:

applying a first photo-resist film to the face of said sheet over said electrode conductors;

photo-etching openings through said film in a plurality of rows parallel to the length of said elongated expendable portion, with each opening in register with a different one of said electrode conductors;

applying a second photo-resist film over said first film;

photo-etching a plurality of channels through said second film, each channel lying directly over one of said rows of openings and thereby communicating with all of the openings of said row; and filling said channels and said openings with electrical conductive material.

* * * * *